June 28, 1960

D. B. PALL 2,942,572

MAGNETIC PRESSURE INDICATOR

Filed June 17, 1958

INVENTOR.
DAVID B. PALL

June 28, 1960

D. B. PALL 2,942,572

MAGNETIC PRESSURE INDICATOR

Filed June 17, 1958

INVENTOR.
DAVID B. PALL

# 2,942,572
MAGNETIC PRESSURE INDICATOR

David B. Pall, Roslyn Heights, N.Y., assignor to Pall Corporation, Glen Cove, N.Y., a corporation of New York Filed June 17, 1958, Ser. No. 742,657

9 Claims. (Cl. 116—117)

This invention relates to pressure indicating devices and, more particularly, to a new and improved magnetic device for indicating the occurrence of pressure differences greater than a predetermined value.

In hydraulic systems wherein fluid such as oil or the like is passed through a filter, it is desirable to provide external means for indicating clogging of the filter element such as by accumulation of sufficient dirt to impede the flow of fluid. Inasmuch as the pressure drop across the filter increases in proportion to the accumulation of dirt in the filter element, a suitable indication may be obtained by utilizing a differential pressure device set to be actuated when the pressure drop in the filter reaches a predetermined value. At low temperatures, however, the increased viscosity of many fluids such as oil results in increased pressure drop across the filter even though the filter element may not be clogged.

Accordingly, it is an object of this invention to provide a new and improved pressure indicator utilizing magnetic attraction settable to respond when a predetermined pressure is obtained.

Another object of the invention is to provide a pressure indicator of the above character adapted to detect clogging of the filter element.

A further object of the invention is to provide a pressure indicator of the above type which does not respond to increases in pressure resulting from low temperature.

These and other objects of the invention are accomplished by utilizing a first magnetic element arranged to attract a second magnetic element as long as the two elements are separated by less than a predetermined distance. In one embodiment of the invention, the first magnetic element is movable with a piston responsive to changes in pressure and is normally biased toward the second magnetic element by a predetermined force. The second magnetic element, normally retained toward the first element by magnetic attraction, is urged away from the first element by a spring capable of overcoming the magnetic attraction when the two elements are separated by the predetermined distance. In order to prevent actuation at low temperatures, a bimetallic strip is positioned to prevent motion of the second magnetic element when the temperature is below a predetermined value.

Further objects and advantages of the invention will be apparent from a reading of the following description in conjunction with the accompanying drawings in which.

Figure 1:
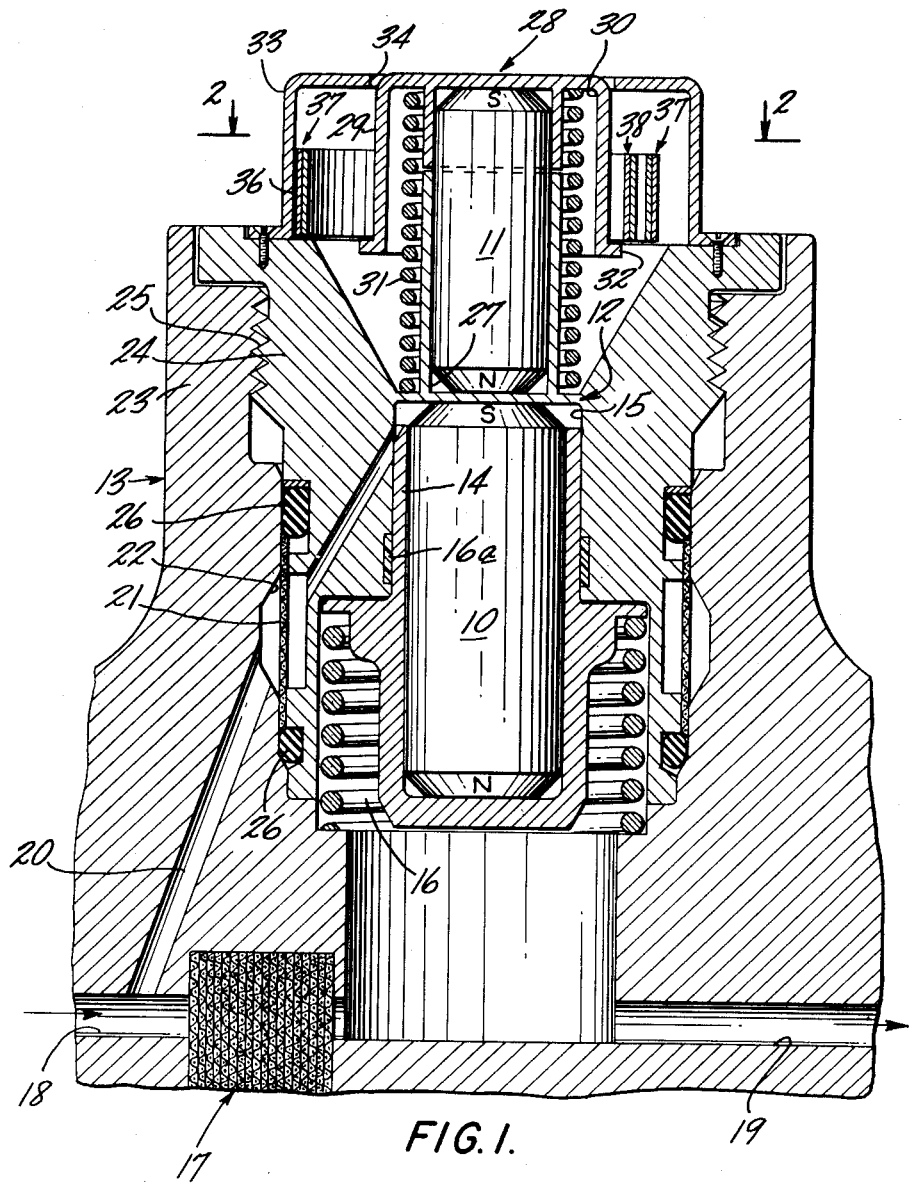
Fig. 1 is a view in longitudinal section taken through a typical pressure indicator arranged according to the invention.
Figure 2:
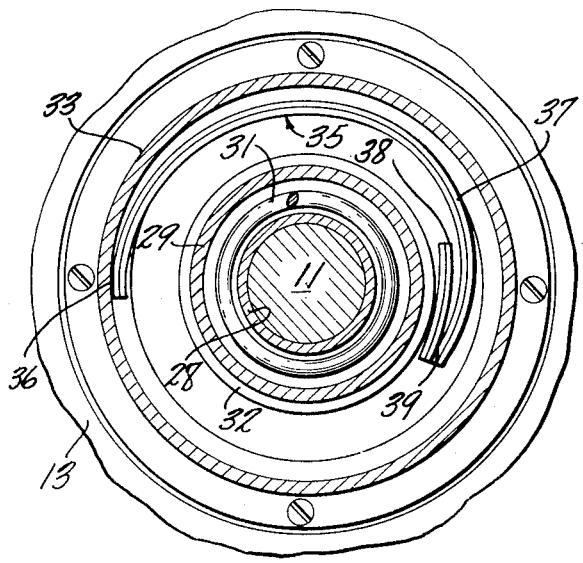
Fig. 2 is a sectional view taken on the lines 2—2 of Fig. 1 and looking in the direction of the arrows.

As shown in Figs. 1 and 2, a representative pressure indicator arranged according to the invention comprises two magnetic elements 10 and 11 coaxially mounted on opposite sides of a separating wall 12 within a housing 13. Preferably, both the elements 10 and 11 are composed of permanently magnetized Alnico V or the like and are positioned with opposite magnetic poles adjacent the wall 12 so that each is drawn toward the wall by the resulting force of attraction. If desired, however, only one of these elements need be a permanent magnet and the other may be formed of suitable magnetic material such as iron, for example.

Mounted in a tubular piston 14, the magnet 10 is slidably supported in a cylindrical bore 15 in the housing 13 and is urged toward the wall 12 by a coil spring 16. In order to prevent fluid from passing from one end of the bore 15 to the other, a liquid-tight seal is provided between the bore and the piston 14 by a ring 16a of "Teflon" or other suitable material. The coil spring 16 is selected according to the desired actuating pressure to permit the piston 14 to move downwardly in the bore 15 when the pressure at the upper end of the piston 14 exceeds that at the lower end by an amount equal to the actuating pressure.

In the illustrated embodiment of the invention, the pressure indicator is arranged to measure the pressure drop across a filter 17, for example. Thus, fluid under pressure is applied to the filter from an inlet line 18 and emerges through an outlet line 19, the difference in pressure between the inlet and outlet lines being a measure of the resistance and, therefore, the clogging of the filter. In order to detect this pressure difference, a duct 20 leads from the inlet line 18 to the end of the cylindrical bore 15 adjacent the wall 12 while the other end of the bore communicates with the outlet line 19.

If desired, in order to prevent dirt carried by the incoming fluid from reaching the bore 15 and to make certain that any fluid which might pass through the bore to the outlet line 19 is clean, a suitable filter element 21 may be inserted in an enlarged portion 22 of the duct 20. As shown in Fig. 1, the enlarged portion 22 may, for example, be a ring-shaped cavity in the housing 13 surrounding one of the magnetic elements. Within this cavity, an annular filter element is inserted, thereby providing a high dirt capacity with low resistance to fluid flow. For ease in assembly and replacement of the filter element 21, the housing 13 may be separable through the enlarged area 22 into two portions 23 and 24 which are joined as by screw threads 25, suitable glands 26 being provided to seal the enlarged area of the duct.

On the other side of the wall 12, the magnetic element 11 is slidably received at one end in a bore 27 coaxial with the bore 15. Secured to the opposite end of the magnet 11 by a press fit, for example, a cap 28 includes a tubular wall 29 extending toward the housing 13 and radially spaced from the magnet. The annular recess 30 thus formed receives a coil spring 31 which extends from the cap 28 to the housing 13 to urge the cap and the magnet 11 away from the wall 12. This spring is selected so that it is retained in the stressed condition with the magnet 11 against the wall 12 by the attractive force of the two magnetic elements as long as the adjacent poles of the two magnets are separated by less than a predetermined distance, for example, one-sixteenth of an inch. Whenever the magnetic element 10 is moved away from the element 11 so that their adjacent poles are separated by more than a sixteenth of an inch, however, the decreased force of magnetic attraction resulting therefrom is overcome by the force of the spring 31 and the cap 28 and element 11 are driven away from the wall 12.

In order to prevent the magnet 11 from being driven completely out of the bore 27, the tubular wall 29 terminates in a radial flange 32, and a drum 33, having a central aperture 34 slightly smaller than the flange 32 but large enough to permit the cap 28 to pass through it, is mounted on the housing 13. Also, a conventional bimetallic element 35 is mounted at one end on the inside surface of the drum 33 as by a weld 36. As best seen in Fig. 2, the bimetallic element is preferably comprised of two arcuate strip portions 37 and 38 joined by a weld 39 and both arranged to bend inwardly with decreasing temperatures. At normal temperatures, the element 35, which is adjacent the wall 29 and just above the flange 32 when the indicator is not actuated, has a minimum radius greater than that of the flange 32 and permits the cap 28 to rise through the aperture 34 on actuation. However, at temperatures below a preselected value at which the viscosity of the fluid to be filtered rises appreciably, for example, 32° F., the element 35 contracts inwardly so that the inner strip 38 extends over the flange 32, thus preventing actuation of the pressure indicator.

In operation, fluid under pressure from the inlet line 18 passes through the duct 20 and the filter 21 to the top of the cylindrical bore 15, urging the magnet 10 and the piston 14 downwardly against the force of the spring 16 and the pressure from the outlet line 19. Whenever the difference between the inlet and outlet pressures is greater than the force of the spring 16, the piston 14 is driven downwardly in the bore 15. After the magnet 10 has moved to a position more than one-sixteenth of an inch away from the magnet 11, the attractive force between the two magnets is less than the force of the spring 31 and the magnet element 11 is driven away from the wall 12 until the flange 32 abuts the inside surface of the drum 33. Thus, the cap 28, which, if desired, may be of a suitable eye-catching color such as red, rises through the aperture 34 to indicate that the pressure difference is greater than the predetermined value in accordance with which the spring 16 has been selected. As an example, the spring 16 may be arranged to permit the magnet 10 to be driven away from the wall 12 when the pressure difference exceeds 35 p.s.i. and return when the pressure is less than 25 p.s.i.

It will be apparent that by suitable dimensioning of the drum 33 and the radial flange 32, the magnet 11 may be permitted to move more than one-sixteenth inch from the normal position of the magnet 10. In this case, the pressure indicator must be reset by manual depression of the cap 28. On the other hand, if the flange 32 is positioned to stop the magnet 11 less than one-sixteenth inch from the normal position of the magnet 10, the indicator will be automatically reset by the attractive force of the magnets, which is greater than that of the spring 31 at this distance, when the magnet 10 is returned to the wall 12.

At temperatures below 32° F., for example, the thermostatic element 35 contracts to move the inner end of the strip 38 over the flange 32. Thus, when the piston 14 and the magnet 10 are moved away from the wall 12 by pressure resulting from increased viscosity of the fluid, the lower edge of the strip 38 intercepts the flange 32 preventing a false indication of filter clogging.

Figure 3:
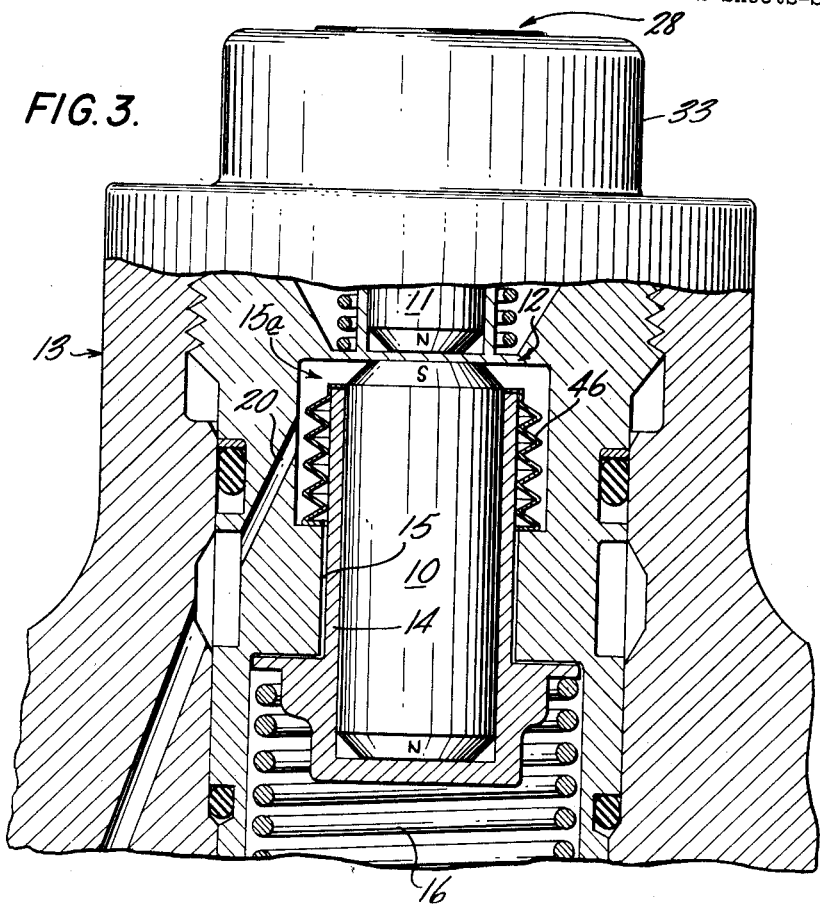
Fig. 3 shows another embodiment of the invention arranged to prevent leakage of fluid through the indicator.

As illustrated in Fig. 3, another pressure indicator may be arranged according to the invention without requiring a filter in the duct 20 or a gasket in the cylindrical bore 15. In this embodiment, a bellows 46 formed of metal or other suitable material is mounted between the top of the piston 14 and the cylindrical bore 15 within a suitably enlarged portion 15a of the bore. In this manner, fluid is positively prevented from passing from the enlarged portion 15a to the bore 15, thus eliminating the need for a filter or gasket. Furthermore, if desired, this form of pressure indicator may be utilized to indicate an actual pressure instead of a pressure difference by opening the lower pressure of the bore 15 to the atmosphere rather than to the outlet line. Similarly, an absolute pressure may be indicated with this embodiment by connecting the bore 15 to a vacuum.

In operation, fluid from the duct 20 fills the enlarged portion 15a driving the piston 14 downward when the fluid pressure exceeds that of any fluid in the bore 15 and the force of the spring 16. As the piston moves downwardly, the bellows 46 closes in accordion fashion but no fluid from the duct 20 passes into the bore 15. When the magnets 10 and 11 are more than one-sixteenth of an inch apart, the spring 31 drives the magnet 11 away from the wall 12 in the manner described above.

Although the invention has been described herein with reference to specific embodiments, many modifications and variations therein will readily occur to those skilled in the art. Accordingly, all such variations and modifications are included within the intended scope of the invention as defined by the following claims.

I claim:

1. A pressure indicating device comprising a housing, piston means movably mounted in the housing, first magnetic means movable with the piston means toward and away from a first position, bias means urging the piston means in one direction and normally retaining the first magnetic means in the first position, fluid duct means communicating with a source of fluid under pressure and with one end of the piston means to urge it in the opposite direction, second magnetic means movable toward and away from the first magnetic means and normally retained toward the first magnetic means by magnetic attraction when the first magnetic means is in the first position, and spring bias means urging the second magnetic means away from the first magnetic means selected to overcome the force of magnetic attraction when the first magnetic means is more than a predetermined distance away from the second magnetic means.

2. A pressure indicating device comprising a housing, piston means movably mounted in the housing, first magnetic means movable with the piston toward and away from a first position, spring bias means urging the piston from a first position, spring bias means urging the piston means in one direction and normally retaining the first magnetic means in the first position, first fluid duct means communicating with a first source of fluid under pressure and with one end of the piston means to urge it in the opposite direction, second fluid duct means communicating with a second source of fluid under pressure and with the other end of the piston means, second magnetic means movable toward and away from the first magnetic means and normally retained toward the first magnetic means by magnetic attraction when the first magnetic means is in the first position, and spring bias means urging the second magnetic means away from the first magnetic means selected to overcome the force of magnetic attraction when the first magnetic means is more than a predetermined distance away from the second magnetic means.

3. A pressure indicating device comprising a housing, piston means movably mounted in the housing, first magnetic means movable with the piston toward and away from a first position, spring bias means urging the piston means in one direction and normally retaining the first magnetic means in the first position, first fluid duct means communicating with a first source of fluid under pressure and with one end of the piston means to urge it in the opposite direction, second fluid duct means communicating with a second source of fluid under pressure and with the other end of the piston means, filter means in the first fluid duct means for preventing impurities in the first source from reaching the piston means or the second source, second magnetic means movable toward and away from the first magnetic means and normally retained toward the first magnetic means by magnetic attraction when the first magnetic means is in the first position, and spring bias means urging the second magnetic means away from the first magnetic means selected to overcome the force of magnetic attraction when the first magnetic means is more than a predetermined distance away from the second magnetic means.

4. A pressure indicating device comprising a housing, piston means movably mounted in the housing, first magnetic means movable with the piston means toward and away from a first position, bias means urging the piston means in one direction and normally retaining the first magnetic means in the first position, fluid duct means communicating with a source of fluid under pressure and with one end of the piston means to urge it in the opposite direction, second magnetic means movable toward and away from the first magnetic means and normally retained toward the first magnetic means by magnetic attraction when the first magnetic means is in the first position, spring bias means urging the second magnetic means away from the first magnetic means selected to overcome the force of magnetic attraction when the first magnetic means is more than a predetermined distance away from the second magnetic means, and stop means limiting the motion of the second magnetic means.

5. A pressure indicator according to claim 4 wherein the stop means permits the second magnetic means to move more than the predetermined distance away from the first position of the first magnetic means.

6. A pressure indicator according to claim 4 wherein the stop means is adjustable to prevent the second magnetic means from moving more than the predetermined distance from the first position of the first magnetic means.

7. A pressure indicating device comprising a housing, piston means movably mounted in the housing, first magnetic means movable with the piston means toward and away from a first position, bias means urging the piston means in one direction and normally retaining the first magnetic means in the first position, fluid duct means communicating with a source of fluid under pressure and with one end of the piston means to urge it in the opposite direction, second magnetic means movable toward and away from the first magnetic means and normally retained toward the first magnetic means by magnetic attraction when the first magnetic means is in the first position, spring bias means urging the second magnetic means away from the first magnetic means selected to overcome the force of magnetic attraction when the first magnetic means is more than a predetermined distance away from the second magnetic means, and thermostat means operable to prevent the second magnetic means from moving away from the first position of the first magnetic means when the temperature is below a predetermined level.

8. A pressure indicator according to claim 7 including flange means on the second magnetic means and wherein the thermostat means comprises a bimetallic strip adapted to bend toward the second magnetic means with decreasing temperature to engage the flange means.

9. A pressure indicator device comprising a housing, piston means movably mounted in the housing, first magnetic means movable with the piston means toward and away from a first position, bias means urging the piston means in one direction and normally retaining the first magnetic means in the first position, fluid duct means communicating with a source of fluid under pressure and with one end of the piston means to urge it in the opposite direction, bellows means between the piston means and the housing preventing fluid from the duct means from passing the piston means, second magnetic means movable toward and away from the first magnetic means and normally retained toward the first magnetic means by magnetic attraction when the first magnetic means is in the first position, and spring bias means urging the second magnetic means away from the first magnetic means selected to overcome the force of magnetic attraction when the first magnetic means is more than a predetermined distance away from the second magnetic means.

References Cited in the file of this patent

UNITED STATES PATENTS

| | | |
|---|---|---|
| 2,649,114 | Wittmann | Aug. 18, 1953 |
| 2,655,894 | Rabbitt | Oct. 20, 1953 |
| 2,669,707 | Ehrman | Feb. 16, 1954 |
| 2,700,362 | Calling | Jan. 25, 1955 |
| 2,767,276 | Buchanan | Oct. 16, 1956 |
| 2,803,718 | Bloom | Aug. 20, 1957 |